United States Patent
Ueno et al.

(10) Patent No.: US 10,954,621 B2
(45) Date of Patent: Mar. 23, 2021

(54) WASHING MACHINE AND MOTOR

(71) Applicant: Samsung Electronics Co., Ltd, Suwon-si (KR)

(72) Inventors: Tomonori Ueno, Kanagawa (JP); Hiroshi Katsumoto, Kanagawa (JP); Taro Yoshida, Kanagawa (JP); Hidekazu Funakoshi, Kanagawa (JP); Yukinori Nakagawa, Kanagawa (JP); Yasuyuki Sonoda, Kanagawa (JP); Masaki Oshige, Kanagawa (JP); Yasumasa Nagasaki, Kanagawa (JP)

(73) Assignee: Samsung Electronics Co., Ltd., Suwon-si (KR)

(*) Notice: Subject to any disclaimer, the term of this patent is extended or adjusted under 35 U.S.C. 154(b) by 76 days.

(21) Appl. No.: 16/228,636

(22) Filed: Dec. 20, 2018

(65) Prior Publication Data
US 2019/0186065 A1    Jun. 20, 2019

(30) Foreign Application Priority Data

Dec. 20, 2017   (JP) .................................. 2017-243893
Sep. 21, 2018   (KR) ........................ 10-2018-0113637

(51) Int. Cl.
*D06F 37/30*   (2020.01)
*D06F 37/38*   (2006.01)
(Continued)

(52) U.S. Cl.
CPC ............ *D06F 37/304* (2013.01); *D06F 37/30* (2013.01); *D06F 37/36* (2013.01); *D06F 37/38* (2013.01);
(Continued)

(58) Field of Classification Search
CPC ......... H02K 16/02; D06F 37/04; D06F 37/30; D06F 37/304; D06F 37/36; D06F 37/38;
(Continued)

(56) References Cited

U.S. PATENT DOCUMENTS 9,708,744 B2    7/2017   Jung et al.
2001/0008354 A1    7/2001   Minagawa
(Continued)

FOREIGN PATENT DOCUMENTS

JP    2011188605 A    9/2011
JP    2017123767 A    7/2017
(Continued)

OTHER PUBLICATIONS

Machine translation of WO-2016080770-A1 to Kim et al. (Year: 2016).*
(Continued)

*Primary Examiner* — Joseph L. Perrin

(57) ABSTRACT

The present disclosure includes a washing machine including an inner rotor and an outer rotor. An outer rotor and an inner rotor may be rotated in a synchronous rotation mode or a counter rotation mode by converting the number of magnetic poles of the outer rotor. When the outer rotor becomes inoperable when the outer rotor is set to the number of magnetic poles for performing the counter rotation mode, it is converted to the number of magnetic poles for performing the synchronous rotation mode while the outer rotor is stopped.

19 Claims, 15 Drawing Sheets

(51) Int. Cl.
   *D06F 37/36*   (2006.01)
   *D06F 37/40*   (2006.01)
   *H02K 16/02*   (2006.01)
   *D06F 33/00*   (2020.01)
   *D06F 105/46*   (2020.01)
   *D06F 105/48*   (2020.01)

(52) U.S. Cl.
   CPC .............. *D06F 37/40* (2013.01); *H02K 16/02* (2013.01); *D06F 33/00* (2013.01); *D06F 37/306* (2013.01); *D06F 2105/46* (2020.02); *D06F 2105/48* (2020.02); *D06F 2204/065* (2013.01); *D06F 2204/10* (2013.01)

(58) Field of Classification Search
   CPC ... D06F 37/40; D06F 2105/46; D06F 2105/48
   See application file for complete search history.

(56) References Cited

U.S. PATENT DOCUMENTS

| | | | |
|---|---|---|---|
| 2002/0047418 A1 | 4/2002 | Seguchi et al. | |
| 2004/0119373 A1* | 6/2004 | Akatsu ................. | H02K 7/083 310/266 |
| 2004/0139558 A1 | 7/2004 | Kim et al. | |
| 2010/0050702 A1* | 3/2010 | Kim ...................... | H02K 21/16 68/23 R |
| 2010/0058817 A1* | 3/2010 | Yoshikawa ........... | D06F 37/304 68/139 |
| 2010/0156216 A1* | 6/2010 | Lee ....................... | D06F 37/304 310/89 |
| 2010/0242549 A1* | 9/2010 | Hosoito ................ | D06F 37/306 68/139 |
| 2013/0160499 A1* | 6/2013 | Kim ..................... | D06F 37/304 68/12.16 |
| 2015/0225885 A1* | 8/2015 | Kim ..................... | D06F 37/06 68/140 |
| 2015/0252507 A1* | 9/2015 | Kim ..................... | D06F 37/304 68/23.6 |
| 2016/0130739 A1* | 5/2016 | Song ..................... | D06F 37/40 8/137 |
| 2016/0168775 A1* | 6/2016 | Kim ..................... | H02K 7/116 68/133 |
| 2016/0201246 A1* | 7/2016 | Song ..................... | D06F 37/40 8/137 |
| 2016/0376741 A1* | 12/2016 | Kim ..................... | H02K 1/148 310/90 |
| 2017/0268150 A1* | 9/2017 | Lv ......................... | D06F 37/304 |

FOREIGN PATENT DOCUMENTS

| | | |
|---|---|---|
| KR | 100442373 B1 | 11/2004 |
| KR | 101709490 B1 | 5/2015 |
| KR | 10-2016-0059558 A | 5/2016 |
| KR | 10-2017-0012016 A | 2/2017 |
| WO | WO-2016080770 A1 * | 5/2016 ............. D06F 37/40 |

OTHER PUBLICATIONS

ISA/KR, International Search Report and Written Opinion of the International Search Authority, International Application No. PCT/KR2018-016391, dated Apr. 19, 2019, 11 pages.

Invitation pursuant to Rule 62a(1) EPC dated Oct. 13, 2020 in connection with European Patent Application No. 18 390 260.5, 2 pages.

Supplementary Partial European Search Report dated Jan. 20, 2021 in connection with European Patent Application No. 18 89 0260, 11 pages.

\* cited by examiner

WASHING MACHINE AND MOTOR

CROSS-REFERENCE TO RELATED APPLICATIONS

This application is based on and claims priority under 35 U.S.C. § 119 to Japanese Patent Application No. 2017-243893 filed on Dec. 20, 2017 in the Japanese Intellectual Property Office, and Korean Patent Application No. 10-2018-0113637 filed on Sep. 21, 2018 in the Korean Intellectual Property Office, the disclosures of which are incorporated by reference in their entireties.

BACKGROUND

1. Field

Embodiments of the present disclosure relate to a washing machine and a motor.

2. Description of Related Art

Conventionally, there is known a washing machine including a motor in which an inner rotor and an outer rotor are disposed inwardly and outwardly of a single stator, and capable of independently rotating a rotary tub and a stirring.

In some washing machines, water and laundry in the rotary tub are caused to flow in forward/reverse directions to perform a cleaning action by rotating the stirring body forward/reverse in a washing process, and the rotary tub and the stirring body are rotated in the same direction in a dehydration process.

However, the present disclosure includes applying a plurality of convertible magnets to the rotor that are capable of reversing magnetic poles by applying a magnetizing current. By converting the number of magnetic poles of the rotor, the motor may be rotated in a synchronous rotation mode in which the inner rotor and the outer rotor are rotated in the same direction and in a contra-rotation mode in which the inner rotor and the outer rotor are rotated in different directions.

However, during the application of the magnetizing current to the convertible magnets, there is a case where the magnetic poles of the convertible magnets become unclear, for example, the power is inadvertently turned off. When the operation is restarted in such a state, there is a possibility that the motor becomes inoperable.

SUMMARY

Therefore, it is an aspect of the present disclosure to provide a washing machine and a motor capable of suppressing the occurrence of a problem caused by the converting of the number of magnetic poles of a rotor.

Additional aspects of the disclosure will be set forth in part in the description which follows and may be learned by practice of the disclosure.

In accordance with an aspect of the present disclosure, a washing machine which performs a water supply process and a washing process includes: a rotary tub configured to accommodate laundry; a water tub in which the rotary tub is provided; a pulsator rotatably provided in the rotary tub; a motor configured to rotate the rotary tub and the pulsator; and at least one processor configured to control the motor. The motor may include a stator; a first rotor and a second rotor rotatable independently from the stator; and a converter configured to convert the number of magnetic poles of at least one of the first rotor and the second rotor. The at least one processor may control a conversion operation of the converter to drive the motor in a first rotation mode of rotating the first rotor and the second rotor in the same direction and a second rotation mode of rotating the first rotor and the second rotor in opposite directions, and control the converter so that the motor is driven in the first rotation mode before the water supply process is started.

The at least one processor may control the motor to be driven in the second rotation mode after the water supply process is completed.

The at least one processor may control a magnetizing current to be applied to any one of a U-phase coil, a V-phase coil, and a W-phase coil of the motor after the water supply process is completed.

The at least one processor may control a magnetizing current of a predetermined magnitude to be applied to any one of the U-phase coil, the V-phase coil and the W-phase coil of the motor after the water supply process is completed, and control the amplitude of a d-axis current or the amplitude of a q-axis current on the motor control to be equal to or larger than a predetermined magnitude when the magnetizing current of the predetermined magnitude is applied.

The washing machine may further include: a magnetic flux sensor configured to detect a magnetic flux of at least one of a first magnet of the first rotor and a second magnet of the second rotor. The at least one processor may determine whether the motor is driven in the first rotation mode based on the detection result of the magnetic flux sensor.

The washing machine may further include: a speed sensor configured to detect a rotational speed of the first rotor and the second rotor. The at least one processor may determine whether the motor is driven in the first rotation mode based on the detection result of the speed sensor.

At least one of the first rotor and the second rotor may include a plurality of convertible magnets with magnetic poles that are reversible based on the conversion operation of the converter. The at least one processor may store a position and a magnetic pole of the convertible magnet and control the converter to reverse a magnetic pole having a polarity opposite to a polarity of a magnetic pole for driving the motor in the first rotation mode among the plurality of convertible magnets based on the stored position and magnetic pole of the convertible magnet.

The at least one processor may control the converter to repeatedly reverse the magnetic pole of the convertible magnet until the motor has no magnetic pole whose polarity is opposite to the magnetic pole for driving in the first rotation mode.

The at least one processor may rotate the second rotor in one direction, and control the converter to increase a magnetic force of a front side in the rotating direction of the second rotor of the convertible magnet while the second rotor is rotating.

The at least one processor may rotate the second rotor in a direction opposite to the one direction, and control the converter to increase a magnetic force of the front side in the rotating direction of the second rotor of the convertible magnet while the second rotor is rotating.

The at least one processor may rotate the second rotor in one direction, and control the converter to reverse a magnetic pole of a rear side in the rotating direction of the second rotor of the convertible magnet while the second rotor is rotating.

The at least one processor may rotate the second rotor in a direction opposite to the one direction, and control the converter to reverse a magnetic pole of the rear side in the rotating direction of the second rotor of the convertible magnet while the second rotor is rotating.

In accordance with another aspect of the present disclosure, a motor which comprises a stator, and a first rotor and a second rotor rotatable independently from the stator includes: a converter configured to convert the number of magnetic poles of at least one of the first rotor and the second rotor, and at least one processor configured to control a conversion operation of the converter to drive the motor in a first rotation mode of rotating the first rotor and the second rotor in the same direction and a second rotation mode of rotating the first rotor and the second rotor in opposite directions. The at least one processor may control the converter so that the first rotor and the second rotor are driven in the first rotation mode when the second rotor does not operate when the processor drives the motor in the second rotation mode.

At least one of the first rotor and the second rotor may include a plurality of convertible magnets with magnetic poles that are reversible as a magnetizing current is conducted in coils. The at least one processor may conduct the magnetizing current for converting the magnetic poles of the convertible magnets to a U-phase coil, a V-phase coil, and a W-phase coil of the motor at least one time when the second rotor does not operate.

The at least one processor may drive the first rotor and the second rotor in the first rotation mode after the magnetizing current is conducted to the coils, and repeatedly control the conducting operation on the coils when the second rotor does not operate.

The plurality of convertible magnets may reverse the magnetic poles based on the conversion operation of the converter. The at least one processor may rotate the second rotor in one direction, and control the converter to increase a magnetic force of a front side in the rotating direction of the second rotor of the convertible magnet while the second rotor is rotating.

The at least one processor may rotate the second rotor in a direction opposite to the one direction, and control the converter to increase the magnetic force of the front side in the rotating direction of the second rotor of the convertible magnet while the second rotor is rotating.

The at least one processor may rotate the second rotor in one direction, and control the converter to reverse a magnetic pole of a rear side in the rotating direction of the second rotor of the convertible magnet while the second rotor is rotating, and rotate the second rotor in a direction opposite to the one direction, and control the converter to reverse the magnetic pole of the rear side in the rotating direction of the second rotor of the convertible magnet while the second rotor is rotating.

In accordance with another aspect of the present disclosure, a washing machine which performs a water supply process and a washing process includes: a rotary tub configured to accommodate laundry; a water tub in which the rotary tub is provided; a pulsator rotatably provided in the rotary tub; a motor configured to rotate the rotary tub and the pulsator; and at least one processor configured to control the motor. The motor may include a stator; a first rotor and a second rotor rotatable independently from the stator; and a converter configured to convert the number of magnetic poles of at least one of the first rotor and the second rotor. The at least one processor may control a conversion operation of the converter to drive the motor in a first rotation mode of rotating the first rotor and the second rotor in the same direction and a second rotation mode of rotating the first rotor and the second rotor in opposite directions, and control the converter so that the first rotor and the second rotor are driven in the first rotation mode when the second rotor does not operate when the processor drives the motor in the second rotation mode.

The at least one processor may control the converter so that the first rotor and the second rotor are driven in the first rotation mode when the second rotor does not operate.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments according to the present disclosure will be described with reference to the accompanying drawings. Embodiments as described below are merely illustrative and are not intended to limit the present disclosure, applications thereof, or uses thereof.

Figure 1:
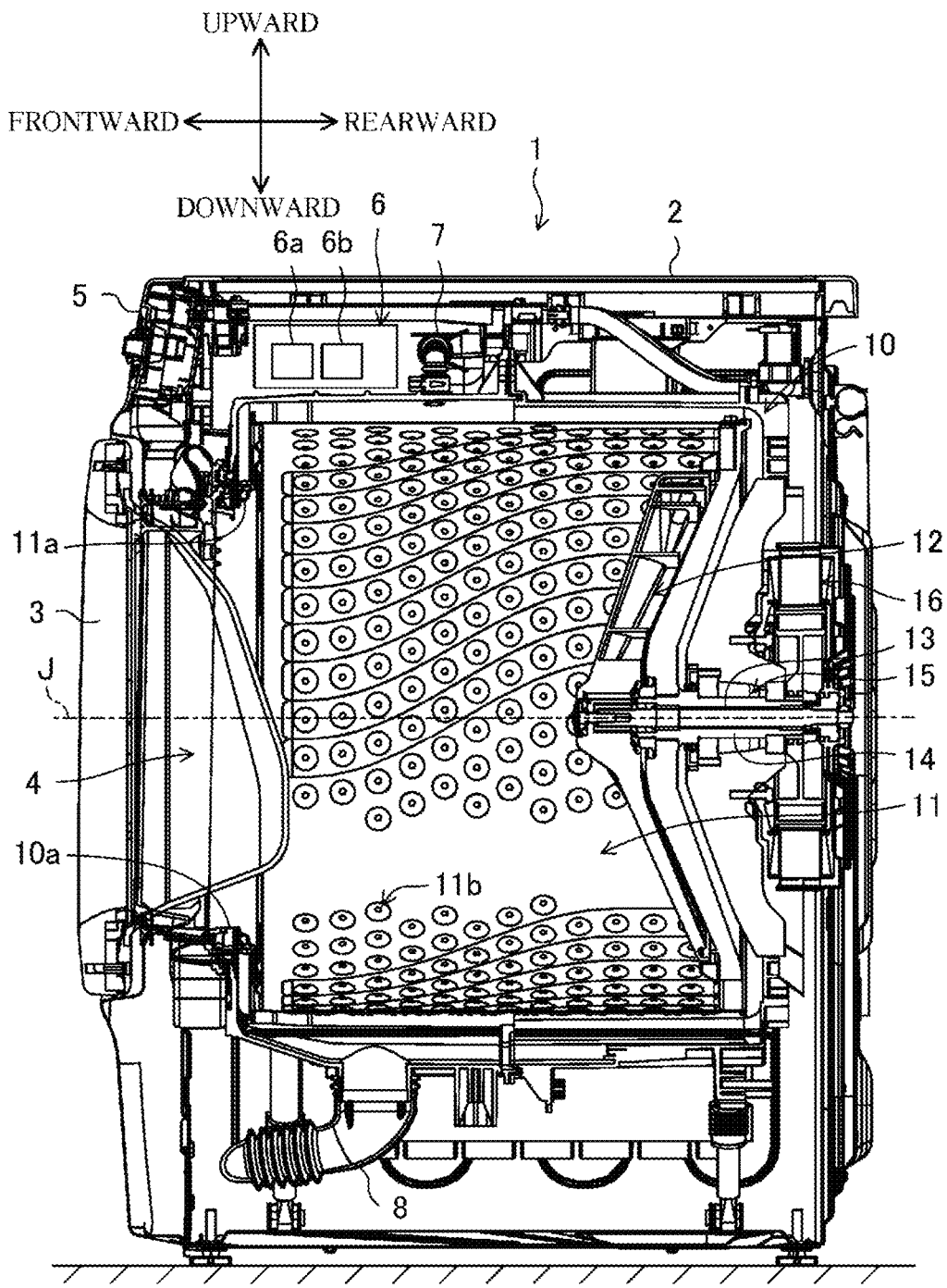
FIG. 1 is a cross-sectional side view illustrating construction of a washing machine according to the present embodiment.

FIG. 1 illustrates a washing machine according to the present embodiment. A washing machine 1 is a fully-automatic washing machine in which processes such as washing, rinsing, and spin-drying are performed by automatic control.

The washing machine 1 has a housing 2 formed in the shape of a rectangular box, and a circular inlet 4 opened and closed by a door 3 may be formed on the front surface of the housing 2. Laundry is put into and taken out of the inlet 4.

A manipulator 5 on which switches and the like are arranged may be provided on an upper portion of the front surface of the housing 2, and a controller 6 may be incorporated in the rear of the manipulator 5. The controller 6 may be implemented with at least one processor. A water tub 10, a drum 11 (rotating tub), a motor 16, a pulsator 12, and the like may be disposed inside the housing 2.

The water tub 10 may be a bottomed cylindrical container having an opening 10a with a smaller diameter than the inner diameter at one end. The water tub 10 may be provided inside the housing 2 in a state in which the opening 10a is disposed horizontally so as to extend toward the inlet 4 and a center line thereof in the substantially horizontal direction in the front and back.

A water feeder 7 may be provided at an upper portion of the water tub 10 so that washing water or rinsing water supplied from the water feeder 7 is stored in a lower portion of the water tub 10 during washing or rinsing. A drain pipe 8 whose opening and closing is controlled by a valve may be connected to the lower portion of the water tub 10, and unwanted water may be drained through the drain pipe 8 to the outside of the washing machine 1.

The drum 11 may be a bottomed cylindrical container having an opening 11a at one end and a bottom at the other end and may be housed in the water tub 10 with the opening 11a facing forward. The drum 11 is rotatable about a rotation axis J extending in the front and rear direction and each process such as washing, rinsing, dehydrating, and the like may be performed in a state in which the laundry is contained in the drum 11.

A plurality of water holes 11b penetrating the inside and outside of the drum 11 may be formed in the peripheral wall portion of the drum 11. The washing water stored in the water tub 10 may flow into the drum 11 through the water holes 11b.

The pulsator 12 may be disposed at the bottom of the drum 11. The pulsator 12 is rotatable about the rotation axis J independently of the drum 11.

A double shaft 15 made up of an inner shaft 13 and an outer shaft 14 may be provided so as to pass through the bottom surface of the water tub 10 with the rotation axis J as the center. The outer shaft 14 may be a cylindrical shaft whose axial length is shorter than that of the inner shaft 13.

The inner shaft 13 is rotatably and axially supported in the outer shaft 14, and the pulsator 12 may be connected and supported at the tip end of the inner shaft 13. The outer shaft 14 is rotatably and axially supported by the water tub 10, and the drum 11 may be connected and supported at the tip end of the outer shaft 14. The proximal ends of the outer shaft 14 and the inner shaft 13 may be connected to the motor 16 disposed on a rear side of the water tub 10.

The motor 16 has an exterior having a flat cylindrical shape whose diameter is smaller than that of the water tub 10 and is attached to the rear side of the water tub 10. The motor 16 may independently drive the outer shaft 14 and the inner shaft 13, respectively.

The controller 6 may include hardware such as a central processing unit (CPU) or a memory and software such as a control program. The controller 6 may be implemented with the memory storing an algorithm to control the operation of the components in the washing machine 1 or data about a program that implements the algorithm, and at least one processor carrying out the aforementioned operation using the data stored in the memory. The memory and the processor may be implemented in separate chips. Alternatively, the memory and the processor may be implemented in a single chip.

The controller 6 may comprehensively control the washing machine 1 and may automatically operate each of the processes such as water supply, washing, rinsing, and dehydrating in accordance with a command input to the manipulator 5. The controller 6 may be provided with a storage 6a and a discriminator 6b. The storage 6a and the discriminator 6b will be described later.

Figure 2:
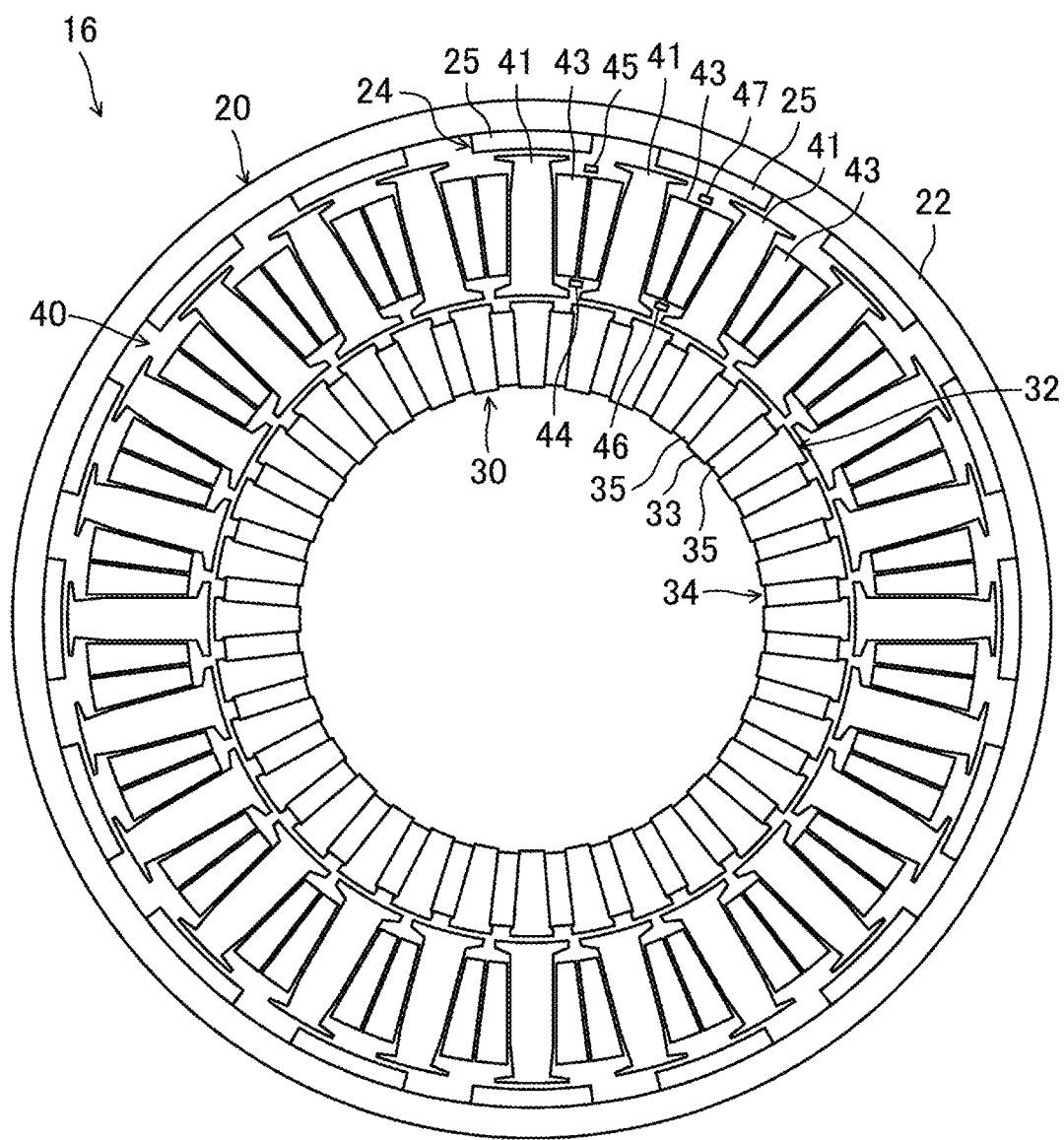
FIG. 2 is a top plane view illustrating an overall configuration of a motor.

The washing machine 1 may include a motor device that implements the driving of the washing machine 1 and the motor device may include the motor 16 and the controller 6. The controller 6 may include hardware such as the CPU or the memory and software such as the control program. The controller 6 may be implemented with the memory storing an algorithm to control the operation of the components in the motor device or data about a program that implements the algorithm, and at least one processor carrying out the aforementioned operation using the data stored in the memory. The memory and the processor may be implemented in separate chips. Alternatively, the memory and the processor may be implemented in a single chip. The controller 6 may comprehensively control the motor device. As illustrated in FIG. 2, the motor 16 may include an outer rotor 20 (a second rotor), an inner rotor 30 (a first rotor), a stator 40, and the like. That is, the motor 16 is a so-called dual rotor motor in which the outer rotor 20 and the inner rotor 30 are respectively disposed outwardly and inwardly of the stator 40 in a diametrical direction.

Because the outer rotor 20 and the inner rotor 30 are directly connected to the pulsator 12 or the drum 11 without a clutch, an accelerator, a decelerator, or the like being interposed therebetween, the outer rotor 20 and the inner rotor 30 are configured to directly operate the pulsator 12 or the drum 11.

The outer rotor 20 and the inner rotor 30 both use coils 43 of the stator 40 and supply an operating current to the coils 43. Consequently, the motor 16 is able to independently control rotations of the outer rotor 20 and the inner rotor 30.

The outer rotor 20 is a cylindrical member having a flat bottom. The outer rotor 20 may include a rotor yoke 22 installed upright at a periphery of the lower portion and a plurality of outer magnets 24 formed of arc-shaped permanent magnets.

In the embodiment of the present disclosure, the outer rotor 20 is a consequent-pole rotor, and 16 of the outer magnets 24 may be arranged so that S-poles are alternately arranged at intervals in a circumferential direction and may be fixed to an inner surface of the rotor yoke 22. The outer magnets 24 may be constituted by a convertible magnet 25 capable of increasing the magnetic force or reversing the magnetic pole by controlling the conduction operation to the coils 43, which will be described in detail later.

The inner rotor 30 is a cylindrical member having a flat bottom and an outer diameter, which is smaller than that of the outer rotor 20. The inner rotor 30 may include an inner peripheral wall 32 vertically installed around the lower portion and a plurality of inner magnets 34 formed of rectangular plate-shaped permanent magnets.

In the embodiment of the present disclosure, the inner rotor 30 is a spoke type rotor. In the inner rotor 30, 32 of the inner magnets 34 are radially arranged at predetermined intervals in the circumferential direction and are fixed to the inner peripheral wall 32. Rotor cores 33 may be disposed in the circumferential direction between the inner magnets 34.

The stator 40 is formed of a ring-shaped member whose outer diameter is smaller than the inner diameter of the outer rotor 20 and whose inner diameter is larger than the outer diameter of the inner rotor 30. In a stator 40, a plurality of teeth 41, the coils 43, or the like are buried in a resin. In the stator 40 according to the embodiment of the present disclosure, 24 of the teeth 41 in an I-shape and the coils 43 may be disposed.

The teeth 41 are metal members having an I-shaped cross-section in a direction in which the teeth 41 extend along a longitudinal axis J. The teeth 41 are radially arranged at equal intervals through slots and are disposed at an entire circumference of the stator 40. Side ends of an inner side and an outer side of the teeth 41 in the diametrical direction protrude in a flange shape from both side corners of the teeth 41 in the circumferential direction.

The coils 43 are formed by continuously winding three wires coated with an insulating material in a predetermined order and predetermined configuration and are disposed at each of the plurality of teeth 41. The groups of the teeth 41, at which the coils 43 are formed, expose only a side end surface of each diameter and are buried in an insulated state in a thermosetting resin by mold formation.

The stator 40, the inner rotor 30, and the outer rotor 20 are attached so that the end of the teeth 41 on the side of the inner rotor 30 oppose the rotor cores 33 with a small clearance therebetween, and the end of the teeth 41 on the side of the outer rotor 20 oppose the outer magnets 24 with a small clearance therebetween.

A digital magnetic flux sensor 44 and a speed sensor 46 are disposed between the adjacent teeth 41 in the vicinity of the inner rotor 30. The magnetic flux sensor 44 is for determining a position of the inner magnet 34 of the inner rotor 30. The speed sensor 46 is for detecting a rotational speed of the inner rotor 30.

An analog magnetic flux sensor 45 and a speed sensor 47 are disposed between the adjacent teeth 41 in the vicinity of the outer rotor 20. The magnetic flux sensor 45 is constituted by, for example, a hall sensor and is for determining a position of the outer magnet 24 of the outer rotor 20. The speed sensor 47 is for detecting a rotational speed of the outer rotor 20.

In the motor 16 according to the embodiment, when the coils 43 of the stator 40 are conducted, different magnetic poles are simultaneously generated at the outer side and the inner side of the teeth 41. The outer rotor 20 and the inner rotor 30 may independently rotate due to a rotating magnetic field.

As described above, by sharing the stator 40 between the outer rotor 20 and the inner rotor 30, it is possible to rotationally operate the outer rotor 20 and the inner rotor 30 in a plurality of rotation modes by a single inverter.

Figure 3:
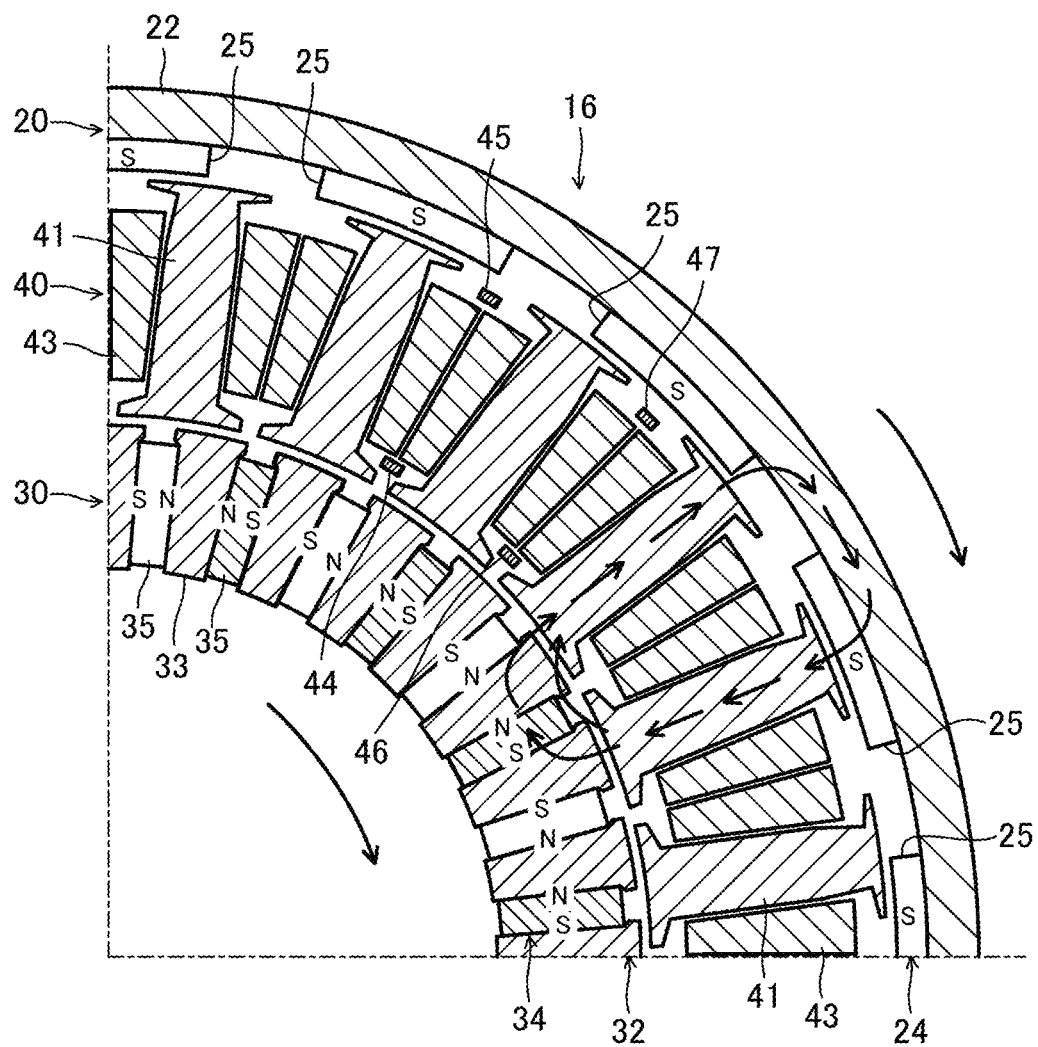
FIG. 3 is a top plane view illustrating a main portion of the motor and illustrates a state in which the number of magnetic poles of an outer rotor is 32.

FIG. 3 is a top plane view illustrating a main portion of the motor and illustrates a state in which a machine angle is 90°. All of the outer magnets 24 may be formed of the convertible magnets 25. All of the inner magnets 34 are formed of the fixing magnets 35. The convertible magnets 25 are magnets whose polarities are reversed when a magnetizing current is supplied to the coils 43, which form a converter. The fixing magnets 35 are magnets whose polarities are not reversed even when the magnetizing current is supplied to the coils 43. The convertible magnets 25 and the fixing magnets 35 are not required to depend on the magnitude of a coercive force, the type of magnets, or the like.

Here, "reversing" and "fixing" indicate polarities of the entirety of magnets, and the polarities are determined on the basis of an overall magnetic flux even when an opposite pole is present at a portion of the magnets.

In the embodiment, the number of poles St of the stator 40 is 24, the number of poles of the inner rotor 30 is 32, and the number of poles of the outer rotor 20 is 32. The ratio of the magnetic poles St:m is 3:4. Here, the outer rotor 20 is capable of converting to 32 or 16 by converting the number of poles by the magnetization.

Referring to FIG. 3, the outer magnet 24 is arranged so that the surface of the outer magnet 24 on the teeth 41 side is the S-pole at predetermined intervals in the circumferential direction. By arranging the outer magnet 24 in this arrangement, the rotor yoke 22 of the outer rotor 20 between the adjacent S-pole outer magnets 24 becomes an N-pole, and the number of magnetic poles of the outer rotor 20 is 32

Figure 4:
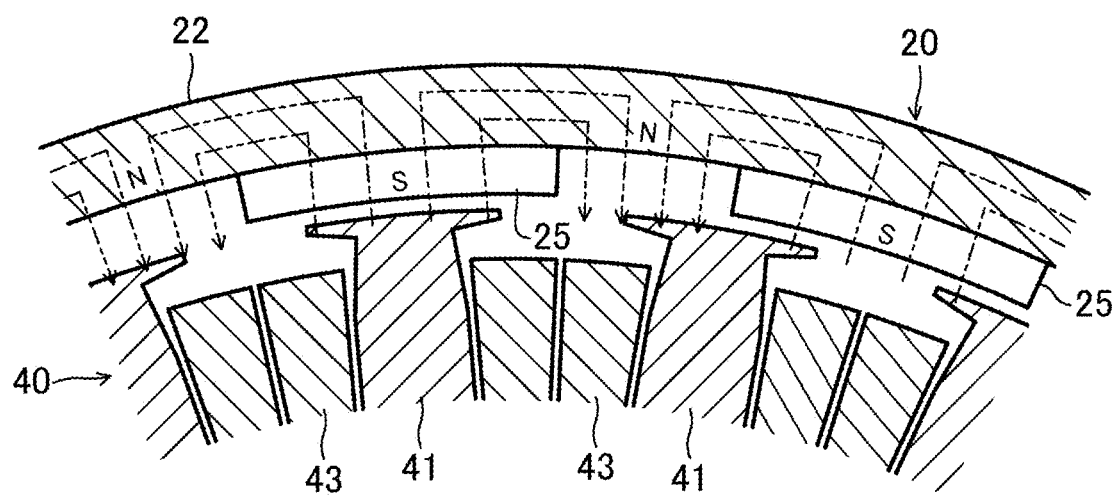
FIG. 4 is a top plane sectional side view illustrating a moving path of a magnetic flux.

(see FIG. 4). Here, because the N-pole portion of the rotor yoke 22 does not have a salient pole structure, magnetic resistances between the rotor yoke 22 and the teeth 41 may become substantially equal. By using such a consequent pole rotor not having the salient pole structure, vibration or noise may be suppressed.

As illustrated in FIG. 4, the magnetic flux that exited from the N-pole portion of the rotor yoke 22 may pass through the inner rotor 30 side through the teeth 41, enter the S-pole of the outer magnet 24 through the other teeth 41, and return the N-pole of the rotor yoke 22 through the rotor yoke 22.

Here, when the number of magnetic poles of the outer rotor 20 is 32, an air gap as a clearance between the rotor yoke 22 of the N-pole of the outer rotor 20 and the teeth 41 of the outer rotor 20 is large, so that an organic voltage is decreased. Therefore, at the time of the dehydration process that uses high-speed rotation and low torque, the number of poles of the outer rotor 20 may be 32.

Figure 5:
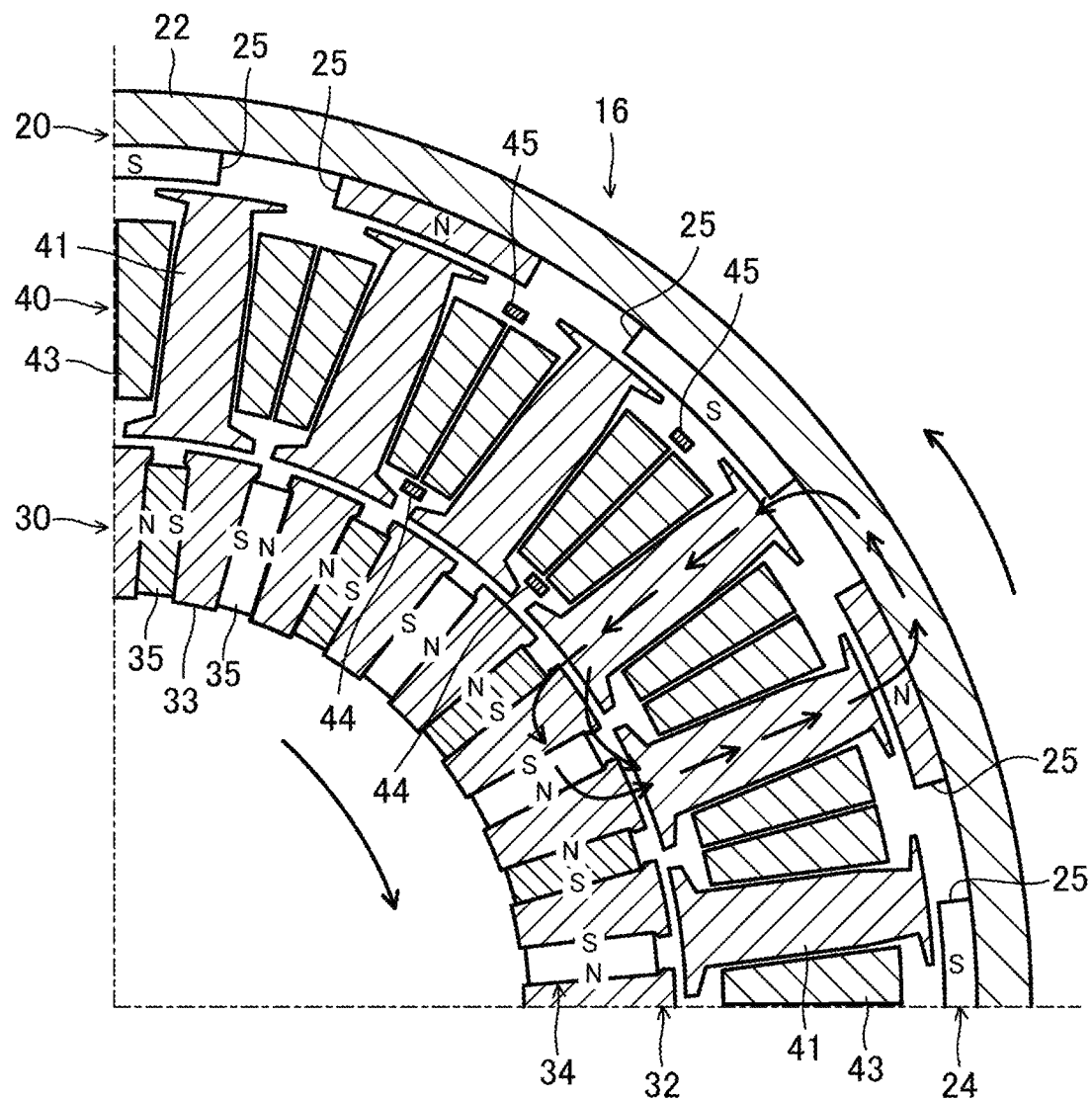
FIG. 5 is a top plane view illustrating the main portion of the motor and illustrates a state in which the number of magnetic poles of the outer rotor is 16.

On the other hand, when the magnetizing current is supplied to the coils 43 to reverse some of the magnetic poles of the outer magnet 24 and the N-poles and the S-poles are alternately arranged at intervals in the circumferential direction as illustrated in FIG. 5, the number of magnetic poles of the outer rotor 20 may become 16.

Figure 6:
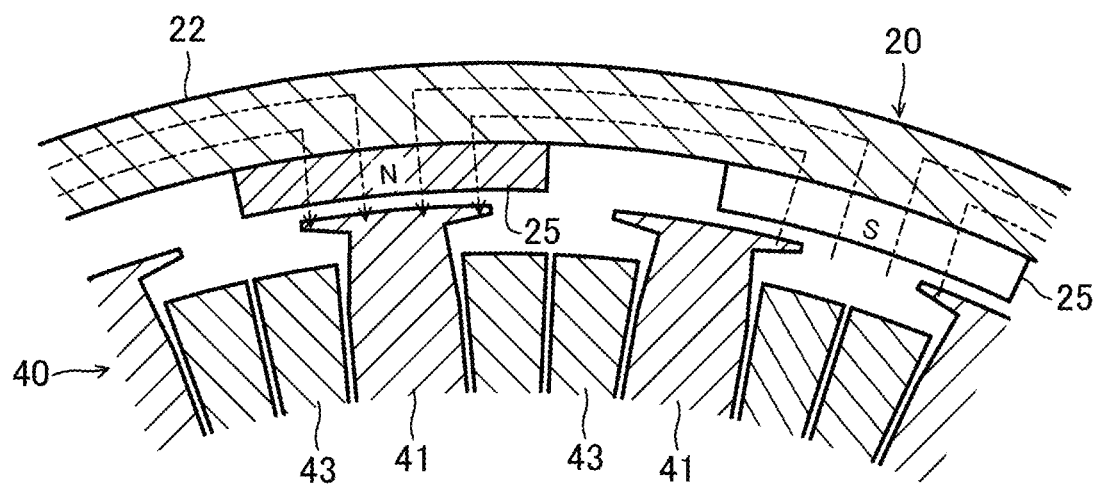
FIG. 6 is a top plane sectional side view illustrating the moving path of the magnetic flux.

As illustrated in FIG. 6, the magnetic flux that exited from the N-pole of the rotor yoke 22 may pass through the inner rotor 30 side through the teeth 41, enter the S-pole of the outer magnet 24 through the other teeth 41, and return the N-pole of the outer magnet 24 through the rotor yoke 22.

Here, when the number of magnetic poles of the outer rotor 20 is 16, the air gap as the clearance between the outer magnet 24 of the N-pole and the teeth 41 of the outer rotor 20 is smaller than the case of 32 magnetic poles, so that the organic voltage is increased. Therefore, at the time of the dehydration process that uses high-speed rotation and low torque, the number of poles of the outer rotor 20 may be 16.

Next, a method of converting the magnetic pole of the outer magnet 24 from 32 to 16 will be described with reference to FIG. 3. In FIG. 3, the number of magnetic poles is 32, but it is possible to make the number of magnetic poles 16 by converting the magnetic pole of a magnet, which is the second from the bottom, from the S-pole to the N-pole. The magnetizing current is flowed to the coils 43 so that a magnetic field (indicated by an arrow of FIG. 3) is flowed in the teeth 41, which is the second from the bottom, and the teeth 41, which is the third from the bottom. In this way, the magnetic pole of the outer magnet 24, which is the second from the bottom, may be reversed from the S-pole to the N-pole.

Next, a method of converting the magnetic pole of the outer magnet 24 from 16 to 32 will be described with reference to FIG. 5. In FIG. 5, the number of magnetic poles is 16, but it is possible to make the number of magnetic poles 32 by converting the magnetic pole of a magnet, which is the second from the bottom, from the N-pole to the S-pole. The magnetizing current is flowed to the coils 43 so that a magnetic field (indicated by an arrow of FIG. 5) is flowed in the teeth 41, which is the second from the bottom, and the teeth 41, which is the third from the bottom. In this way, the magnetic pole of the outer magnet 24, which is the second from the bottom, may be reversed from the N-pole to the S-pole.

In the case of the arrangement of the outer magnet 24 illustrated in FIG. 5, a previous pole is remained in a portion of the outer magnet 24, which is the second from the bottom. In this case, shifting of the magnetic pole may be completed by properly adjusting an angle of the outer rotor 20 and a phase of a magnetizing current, which is to be applied to the coils 43, and performing a magnetization process several times.

Magnetic resistance of a path of a magnetic flux passing through the convertible magnet 25 between the magnetized teeth 41 is higher than the magnetic resistance of a path of a magnetic flux passing through the vicinity of the air gap of the inner rotor 30. That is, in the inner rotor 30, a portion of a magnetic flux passing through the fixing magnet 35 is branched to pass through the vicinity of the air gap.

Because of this, when a magnetizing current is supplied, a larger amount of magnetic flux flows in the convertible magnet 25 than in the fixing magnet 35, and the magnetizing force at a portion of the convertible magnet 25 is larger than the magnetizing force at a portion of the fixing magnet 35.

By properly setting the magnetic path of the magnetic flux or magnetization, for example, even when the convertible magnet 25 and the fixing magnet 35 are formed of ferrite magnets whose coercive forces are equal, converting of a magnetic pole of only the convertible magnet 25 may be stably performed.

The convertible magnet 25 and the fixing magnet 35 may also be formed of two different types of magnets. For example, by setting a coercive force of the fixing magnet 35 to be larger than a coercive force of the convertible magnet 25, more stable magnetization may be obtained. Also, by using a rare earth magnet as the fixing magnet 35 of the inner rotor 30, torque balance between the inner rotor 30 and the outer rotor 20 may be more easily achieved.

Figure 7:
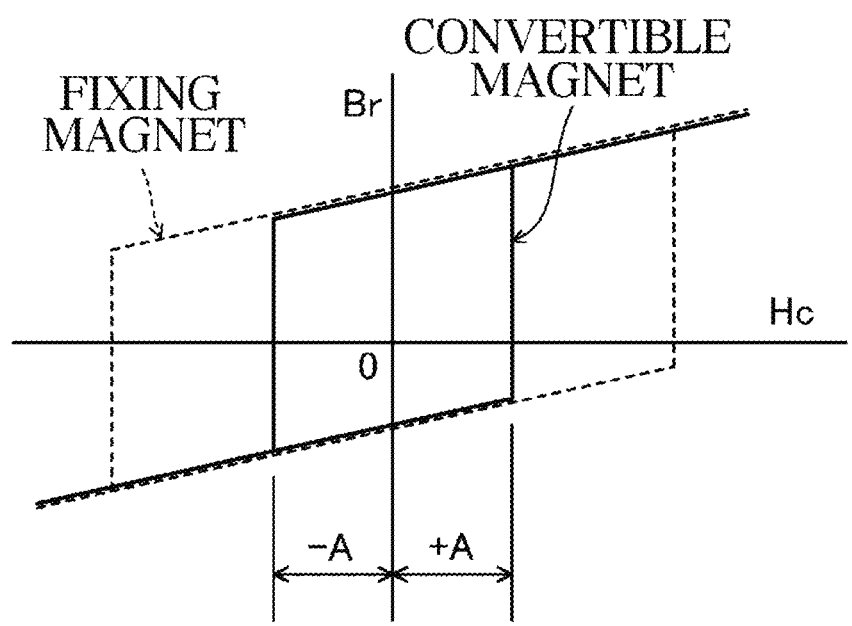
FIG. 7 is a view illustrating a B-H curve when a fixed magnet and a convertible magnet are used with magnets having different coercive forces.

FIG. 7 illustrates a B-H curve (magnetic hysteresis loop) according to certain embodiments of the present disclosure in which magnets having different coercive forces are used as fixing magnets and convertible magnets. Here, by flowing the magnetizing current in the coils 43, the magnetic field may be generated within a range in which a coercive force is +A or higher or −A or lower, and does not exceed a coercive force of the fixing magnet 35. In this way, a magnetic pole of the convertible magnet 25 may be reversed. The magnetizing current may be a pulse current, and magnetization is possible within a time of about several tens of milliseconds.

In magnetizing the convertible magnet 25, a voltage applied to the coils 43 being high, if possible, is advantageous to increase a magnetizing current. Even when a high-speed rotation is performed with low torque as in a spin-drying process, a high voltage may be used. However, when a low-speed rotation is performed with high torque as in a washing process, a rinsing process, or the like, efficiency of the inverter is higher when the voltage is not too high.

Consequently, in the embodiments of the present disclosure, during the dehydration process, a voltage equal to that in the magnetization process is supplied to the inverter. During the washing process, a voltage lower than that in the magnetization process is supplied to the inverter. As a result, power consumption may be reduced.

Here, the converting operation of the number of magnetic poles for supplying the magnetizing current to the coils 43 and reversing the magnetic pole of the convertible magnet 25 may be controlled by the controller 6. That is, the outer rotor 20 and the inner rotor 30 are rotationally operated in a plurality of rotation modes based on the control command of the controller 6.

As illustrated in FIG. 3, when the outer magnets 24 are arranged so that the S-poles are arranged at intervals in the circumferential direction, the rotor yoke 22 of the outer rotor 20 between the outer magnets 24 of the adjacent S-poles have N-poles, and the number of magnetic poles of the outer rotor 20 becomes 32. At this time, the outer rotor 20 and the inner rotor 30 may rotate in the same direction (clockwise in FIG. 3). In the embodiments of the present disclosure, the rotation mode is referred to as a synchronous rotation mode.

On the other hand, when the magnetizing current is supplied to the coils 43 to reverse some of the magnetic poles of the outer magnet 24 and the outer magnet 24 is converted so that the N-poles and the S-poles are alternately arranged at intervals in the circumferential direction as illustrated in FIG. 5, the number of magnetic poles of the outer rotor 20 may become 16. At this time, the outer rotor 20 rotates counterclockwise while the inner rotor 30 rotates clockwise. That is, the outer rotor 20 and the inner rotor 30 may rotate at different speeds and in different directions. In the embodiments of the present disclosure, this rotation mode is referred to as a counter rotation mode.

As the rotation mode, a different rotation ratio or the same rotation ratio of the synchronous rotation mode and the counter rotation mode may be configured by the combination of the number of magnetic poles in addition to the embodiments. As described above, the synchronous rotation mode or the counter rotation mode may also include a rotation mode in which the outer rotor 20 and the inner rotor 30 rotate in a certain rotation ratio or rotate with a different torque by rotating at the same speed or at a different speed in the same or different directions.

Further, in the embodiments according to the present disclosure, although a three-phase current is flowed according to the position of the inner rotor 30 and the outer rotor 20 detected by the magnetic flux sensors 44 and 45, the embodiments are not limited to this. For example, a so-called sensorless method, in which an organic voltage is used or a detected current is used, may also be employed. Other means such as an inverter may also be used to control an operating current.

Before the start of the water supply process, the drum 11 may be rotated in order to disentangle the laundry in the drum 11. However, when the number of poles of the outer rotor 20 becomes unclear such as the power is turned off unintentionally while the number of poles of the outer rotor 20 is being converted, there is a fear that the motor 16 will be rotated in the counter rotation mode when the operation is restarted. In the counter rotation mode, the drum 11 and the pulsator 12 are rotated in reverse directions, so that the laundry is twisted, and clothing may be damaged.

Therefore, in the embodiments according to the present disclosure, before the start of the water supply process, the number of magnetic poles of the outer rotor 20 may be converted to the number of poles for performing the synchronous rotation mode. After the water supply process is completed, the number of magnetic poles of the outer rotor 20 may be converted to the number of poles for performing the counter rotation mode.

In particular, when the magnetizing current is supplied to the U-phase coil 43, a qd axis current of the motor control may change greatly. The current amplitude at the time of the normal operation of the motor 16 is about 0.5 A to 10 A, but the current used for magnetization varies depending on the specification of the magnet, but the current amplitude is about 15 A to 30 A.

Thus, the operation for disentangling the laundry before the start of the water supply process is performed in the synchronous rotation mode, thereby reducing the risk of damage to the laundry.

Whether or not the motor 16 is being operated in the synchronous rotation mode is determined based on the detection results of the magnetic flux sensor 45 and the speed sensors 46 and 47. In particular, the magnetic flux sensor 45 disposed on the outer rotor 20 side may detect the positions and magnetic poles of the plurality of convertible magnets 25. The speed sensor 46 may detect the rotational speed of the inner rotor 30. The speed sensor 47 may detect the rotational speed of the outer rotor 20.

The detection results of the magnetic flux sensor 45 and the speed sensors 46 and 47 are transmitted to the controller 6 and stored in the storage 6a. The discriminator 6b of the controller 6 may determine the number of magnetic poles of the outer rotor 20 from the detection result of the magnetic flux sensor 45 and determine whether or not the number of magnetic poles is converted to the number of magnetic poles for performing the synchronous rotation mode.

The discriminator 6b may also determine whether the synchronous rotation mode is being performed by detecting the speed difference between the outer rotor 20 and the inner rotor 30 from the detection results of the speed sensors 46 and 47.

After completion of the water supply process, the number of magnetic poles of the outer rotor 20 is converted so that the motor 16 is controlled to rotate in the counter rotation mode. Thus, in the washing process, the cleaning effect may be enhanced by rotating the drum 11 and the pulsator 12 in the reverse directions.

Hereinafter, the procedure of the initialization control for converting to the number of magnetic poles for performing the synchronous rotation mode before the start of the water supply process will be described using the flowchart of FIG. 8.

Figure 8:
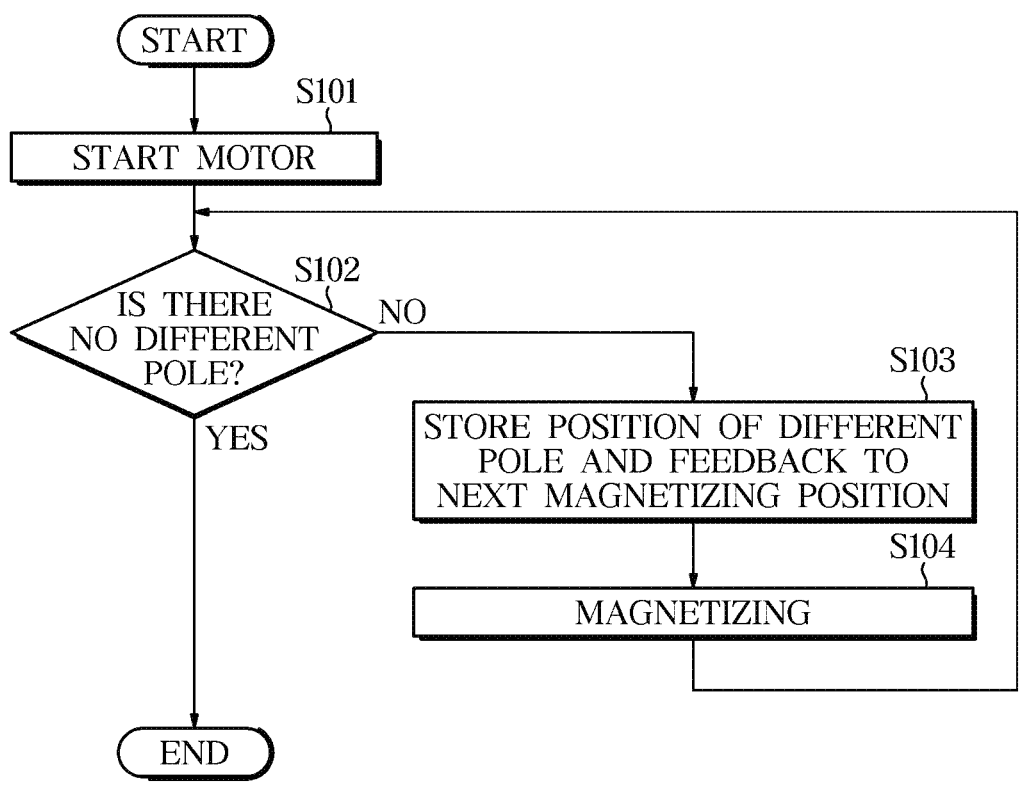
FIG. 8 is a flowchart illustrating a procedure of initialization control for converting to the number of magnetic poles for performing a synchronous rotation mode before the start of a water supply process.

As illustrated in FIG. 8, in step S101, the motor 16 is started, and the flow proceeds to step S102.

Figure 9:
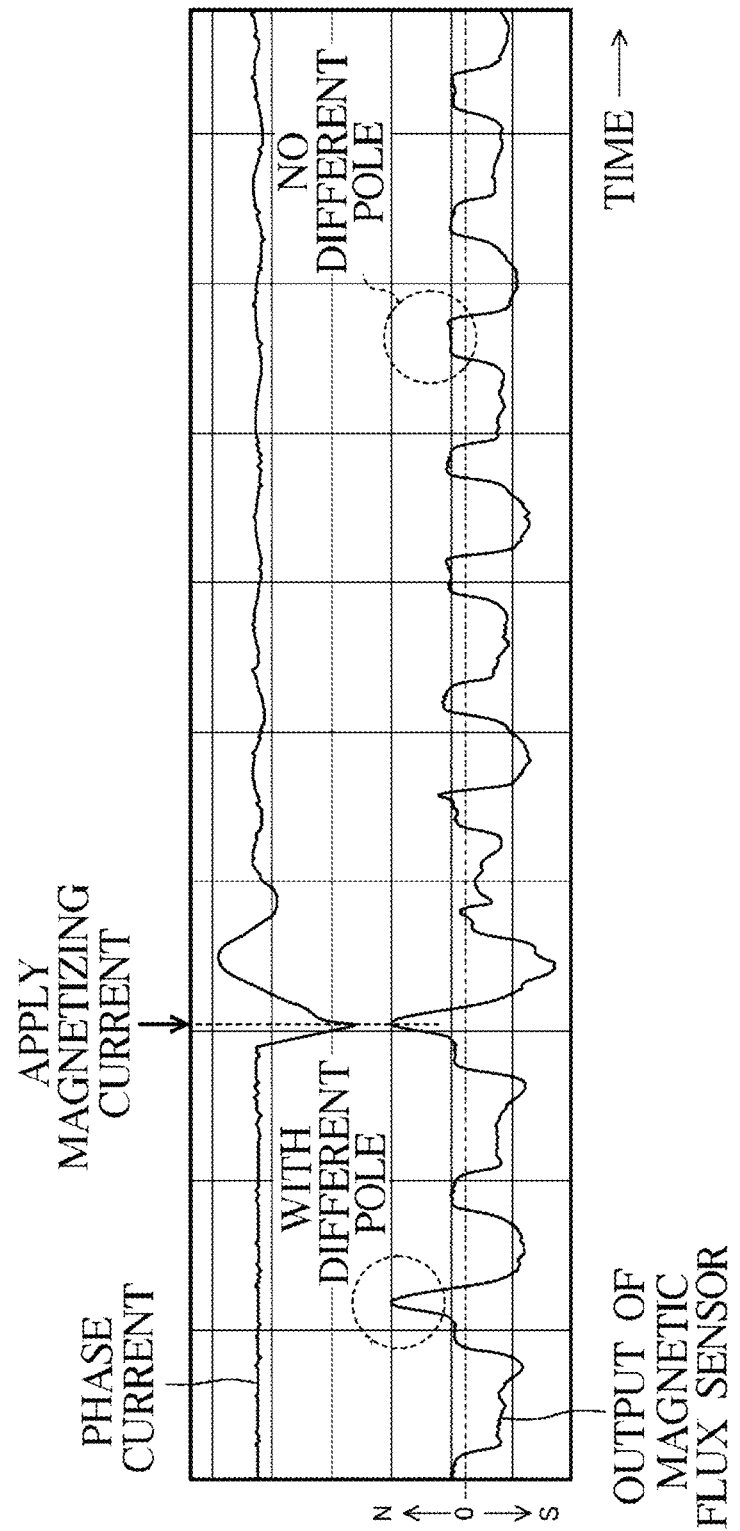
FIG. 9 is a view illustrating a state in which a magnetizing current is applied in order to remove a different pole.

In step S102, it is determined whether or not there is the convertible magnet 25 having a polarity opposite to that of the magnetic pole for performing the synchronous rotation mode, that is, the presence or absence of a different pole, among the plurality of convertible magnets 25. As illustrated in FIG. 9, the presence or absence of the different pole may be determined from the output of the magnetic flux sensor 45. That is, among the output signals periodically obtained by the magnetic flux sensor 45, it may be determined that the portion protruding in the positive direction is the magnetic pole of the convertible magnet 25 as the N pole. When the determination in step S102 is "NO," the flow proceeds to step S103. When the determination in step S102 is "YES," the process is terminated.

In step S103, the position of the different pole is stored in the storage 6a, and feedback to the next magnetizing position, and the flow proceeds to step S104.

In step S104, the convertible magnet 25 of the different pole is magnetized, and the flow returns to step S102. As illustrated in FIG. 9, polarity inversion may be performed by applying the magnetizing current to the N-pole convertible magnet 25.

Then, steps S102 to S104 are repeated to perform the polarity inversion of the convertible magnet 25 until the polarity opposite to the polarity for the synchronous rotation mode is eliminated. Thereby, the synchronous rotation mode may be reliably performed.

In the embodiments according to the present disclosure, the outer rotor 20 and the inner rotor 30 are rotated in the synchronous rotation mode or the counter rotation mode by converting the number of magnetic poles of the outer rotor 20.

There is a possibility that if the power is inadvertently turned off during the counter rotation mode and the motor 16 is restarted to operate again, if there is an abnormality such as decrease of the magnetic force in the counter rotation mode and the torque is insufficient, the rotor may not be completely started.

Therefore, in the embodiments, the number of magnetic poles is converted during the stoppage of the outer rotor 20 to return to the synchronous rotation mode, thereby the lack of torque is eliminated and the outer rotor 20 is made operable. Hereinafter, the return procedure when the motor 16 becomes inoperable will be described using the flowchart of FIG. 10.

Figure 10:
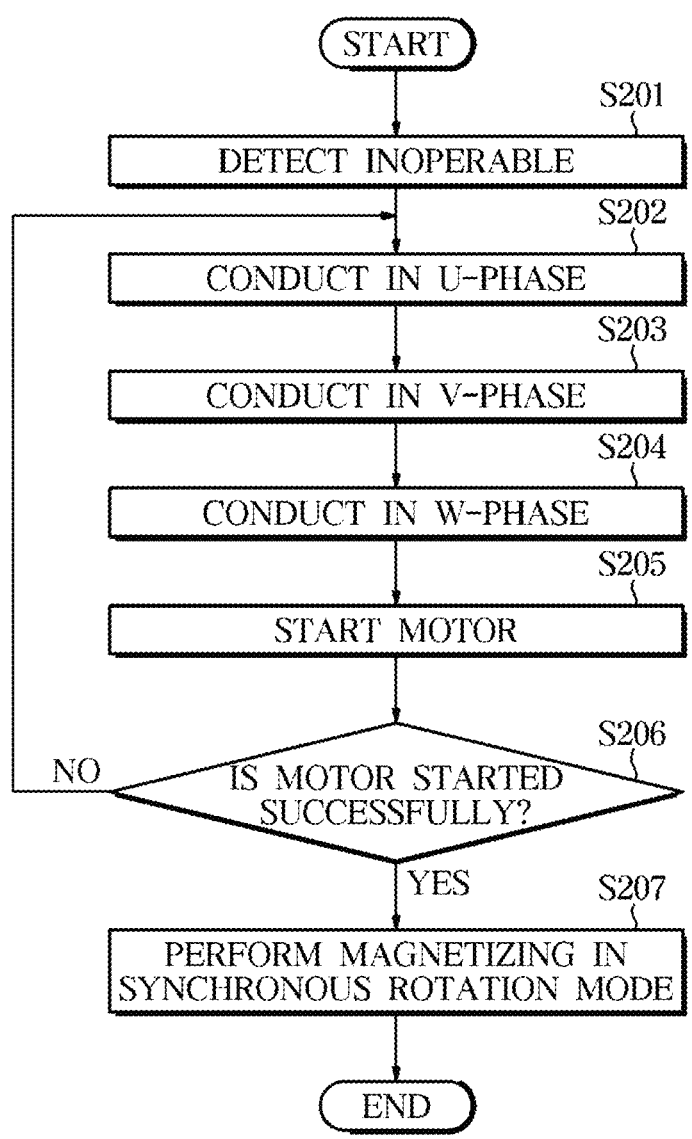
FIG. 10 is a flowchart illustrating a return procedure when the motor becomes an inoperable state.

As illustrated in FIG. 10, in step S201, it is detected that the motor 16 becomes inoperable, and the flow proceeds to step S202.

In step S202, the U-phase coil 43 is conducted, and the flow proceeds to step S203.

In step S203, the V-phase coil 43 is conducted, and the flow proceeds to step S204.

In step S204, the W-phase coil 43 is conducted, and the flow proceeds to step S205.

In step S205, the motor 16 is started to operate the outer rotor 20 and the inner rotor 30 in the synchronous rotation mode after conduction of the magnetizing currents to the U-phase, V-phase, and W-phase coils 43, and the flow proceeds to step S206.

In step S206, it is determined whether or not the motor 16 is started. When the determination in step S206 is "YES," the flow proceeds to step S207. When the determination in step S206 is "NO," the flow proceeds to step S202.

In step S207, the convertible magnet 25 is increased of the magnetic force to perform the synchronous rotation mode and the flow is terminated. Thereby, the lack of torque may be solved and the outer rotor 20 may be made operable.

On the other hand, when the outer rotor 20 continues to be inoperable, the operation of conducting the U-phase, V-phase, and W-phase coils 43 may be repeated (step S202 to step S206).

In order to reverse the convertible magnet 25 by conducting the U-phase, V-phase and W-phase coils 43 at least one time when the outer rotor 20 becomes inoperable, the convertible magnet 25 is opposed to one of the U-phase, the V-phase, and the W-phase teeth 41 at the time of stopping the outer rotor 20.

Figure 11:
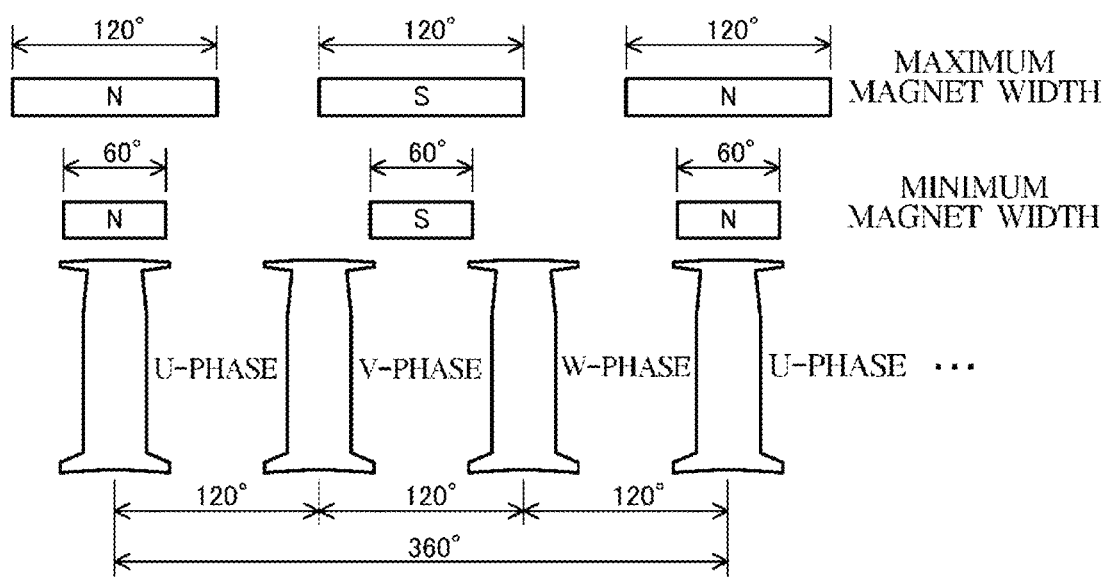
FIG. 11 is a view illustrating the relationship between a width and an electric angle of the convertible magnet.

In particular, as illustrated in FIG. 11, the U-phase, the V-phase, and the W-phase teeth 41 may be arranged so as to be separated from each other by an electrical angle of 120°. Therefore, if the width (θ) of the convertible magnet 25 is set within a range of 60°<θ<120° with the minimum magnet width being an electrical angle of 60° and the maximum magnet width being an electrical angle of 120°, the convertible magnet 25 is opposed to one of the U-phase, the V-phase, and the W-phase teeth 41 at the time of stopping the outer rotor 20, so that the polarity of the convertible magnet 25 may be surely reversed.

Inside the convertible magnet 25, the magnetic flux flows from the S-pole to the N-pole. The magnetic force of the convertible magnet 25 may be increased by flowing the magnetic flux in the same direction as the magnetic flux flowing in the convertible magnet 25. In addition, the magnetic flux is made to flow in the opposite direction to the magnetic flux flowing in the convertible magnet 25, so that the polarity of the convertible magnet 25 may be reversed.

As illustrated in FIGS. 12 to 15, in the present disclosure, the rotating direction of the outer rotor 20 and the position of the convertible magnet 25 may be considered when the magnetic force of the convertible magnet 25 is increased or reversed.

Figure 12:
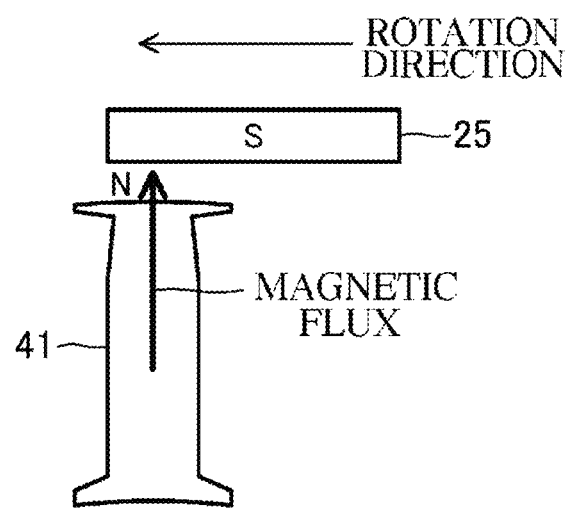
FIG. 12 is a view illustrating the timing of increasing an S-pole convertible magnet.

First, as illustrated in FIG. 12, the case where the outer rotor 20 rotates in one direction (left direction in FIG. 12) and the S-pole convertible magnet 25 opposed to the teeth 41 is increased will be examined.

In this case, during rotation of the outer rotor 20, the magnetic flux is caused to flow from the teeth 41 toward the front portion of the convertible magnet 25 in the rotating direction (the left portion in FIG. 12), thereby increasing the left portion of the convertible magnet 25. As a result, a suction force is applied between the left portion of the convertible magnet 25 and the teeth 41 when the convertible magnet 25 is increased and the outer rotor 20 is accelerated in the rotating direction, so that a magnetizing sound may be reduced.

Further, with respect to the remaining right portion (the rear portion in the rotating direction in FIG. 12) after the left portion of the convertible magnet 25 is increased, the outer rotor 20 may be rotated in the reverse direction to similarly increase.

That is, during the reverse rotation of the outer rotor 20, the magnetic flux is caused to flow from the teeth 41 toward the front portion of the convertible magnet 25 in the reverse rotating direction (the right portion in FIG. 12), thereby increasing the right portion of the convertible magnet 25. As a result, the suction force is applied between the right portion of the convertible magnet 25 and the teeth 41 when the convertible magnet 25 is increased and the outer rotor 20 is accelerated in the reverse rotating direction, so that the magnetizing sound may be reduced.

Figure 13:
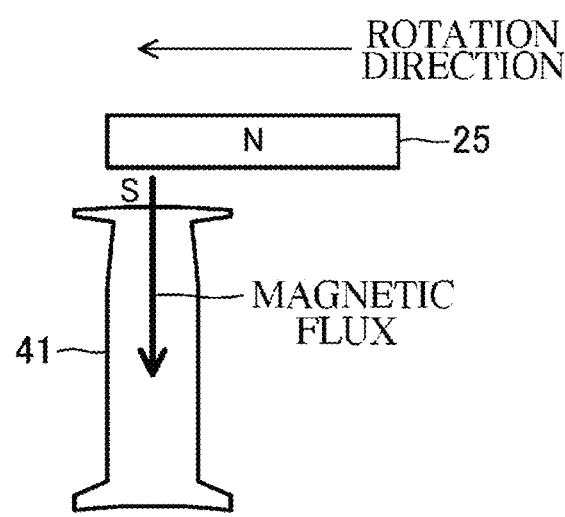
FIG. 13 is a view illustrating the timing of increasing an N-pole convertible magnet.

FIG. 13 illustrates the magnetic flux flow when the outer rotor 20 rotates in one direction (left direction in FIG. 13) and the N-pole convertible magnet 25 opposed to the teeth 41 is to be increased.

As illustrated in FIG. 13, during the rotation of the outer rotor 20, the magnetic flux is caused to flow from the front portion of the convertible magnet 25 in the rotating direction (the left portion in FIG. 13) toward the teeth 41, thereby increasing the left portion of the convertible magnet 25. As a result, the suction force is applied between the left portion of the convertible magnet 25 and the teeth 41 when the convertible magnet 25 is increased and the outer rotor 20 is accelerated in the rotating direction, so that the magnetizing sound may be reduced.

Further, with respect to the remaining right portion (the rear portion in the rotating direction in FIG. 13) after the left portion of the convertible magnet 25 is increased, the outer rotor 20 may be rotated in the reverse direction to similarly increase.

Figure 14:
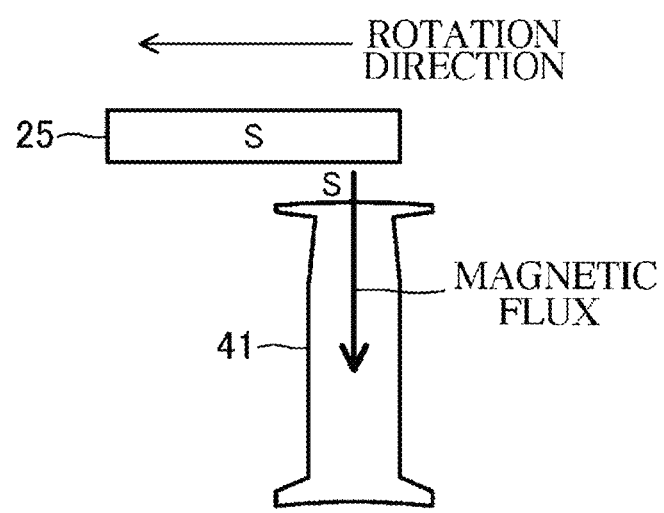
FIG. 14 is a view illustrating the timing of polarity reversal of the S-pole convertible magnet.

Next, as illustrated in FIG. 14, the case where the outer rotor 20 rotates in one direction (left direction in FIG. 14) and the S-pole convertible magnet 25 opposed to the teeth 41 is polar reversed will be examined.

In this case, during the rotation of the outer rotor 20, the magnetic flux is caused to flow from the rear portion of the convertible magnet 25 in the rotating direction (the right portion in FIG. 14) toward the teeth 41, thereby polar reversing the right portion of the convertible magnet 25. As a result, a repulsive force is applied between the right portion of the convertible magnet 25 and the teeth 41 when the convertible magnet 25 is reversed in polarity, and the outer rotor 20 is accelerated in the rotating direction, so that the magnetizing sound may be reduced.

Further, with respect to the remaining left portion (the front portion in the rotating direction in FIG. 14) after the right portion of the convertible magnet 25 is polar reversed, the outer rotor 20 may be rotated in the reverse direction to similarly reverse the polarity.

Figure 15:
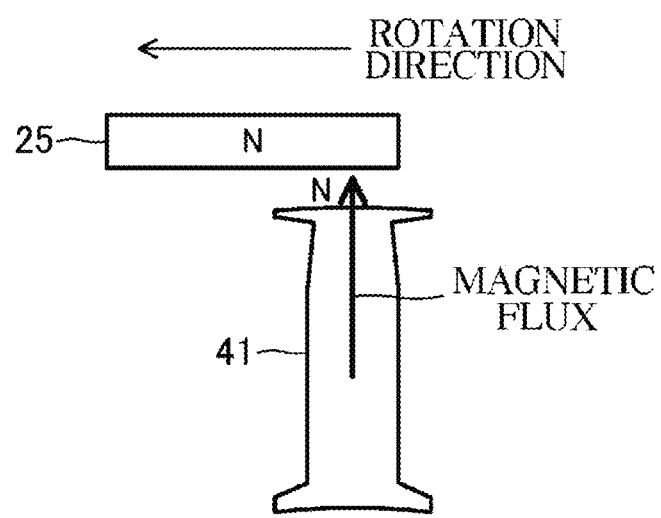
FIG. 15 is a view illustrating the timing of polarity reversal of the N-pole convertible magnet.

FIG. 15 illustrates the magnetic flux flow when the outer rotor 20 rotates in one direction (left direction in FIG. 15) and the N-pole convertible magnet 25 opposed to the teeth 41 is to be polar reversed.

As illustrated in FIG. 15, during the rotation of the outer rotor 20, the magnetic flux is caused to flow from the teeth 41 toward the rear portion of the convertible magnet 25 in the rotating direction (the right portion in FIG. 15), thereby polar reversing the right portion of the convertible magnet 25. As a result, the repulsive force is applied between the right portion of the convertible magnet 25 and the teeth 41 when the convertible magnet 25 is reversed in polarity, and the outer rotor 20 is accelerated in the rotating direction, so that the magnetizing sound may be reduced.

Further, with respect to the remaining left portion (the front portion in the rotating direction in FIG. 15) after the right portion of the convertible magnet 25 is polar reversed, the outer rotor 20 may be rotated in the reverse direction to similarly reverse the polarity.

The above-described embodiment may be configured as follows.

In the present embodiment, the number of poles of the outer rotor 20 may be converted by providing the convertible magnet 25 in the outer rotor 20. However, the number of poles of the inner rotor 30 may be converted by providing the convertible magnet 25 in the inner rotor 30.

As described above, the present disclosure is extremely useful and highly industrially utilizable in that a highly practical effect of suppressing the occurrence of problems caused by the converting of the number of magnetic poles of the rotor can be obtained.

As is apparent from the above description, according to an aspect of the disclosure, the washing machine and the motor can suppress the occurrence of the problem caused by the converting of the number of magnetic poles of the rotor.

Although the present disclosure has been described with various embodiments, various changes and modifications may be suggested to one skilled in the art. It is intended that the present disclosure encompass such changes and modifications as fall within the scope of the appended claims.

What is claimed is:

1. A washing machine that performs a water supply process and a washing process, the washing machine comprising:
   a rotary tub configured to accommodate laundry;
   a water tub in which the rotary tub is provided;
   a pulsator provided in the rotary tub and configured to rotate;
   a motor configured to rotate the rotary tub and the pulsator, wherein the motor comprises:
   a stator including a plurality of coils,
   a first rotor rotatable independently from the stator, and
   a second rotor rotatable independently from the stator,
   wherein the plurality of coils are configured to convert a number of magnetic poles of at least one of the first rotor or the second rotor; and
   at least one processor configured to:
   control a current supplied to the plurality of coils to perform a conversion operation so that the motor is driven in (i) a first rotation mode of rotating the first rotor and the second rotor in a same direction or (ii) a second rotation mode of rotating the first rotor and the second rotor in opposite directions, and
   control the current supplied to the plurality of coils to drive the motor in the first rotation mode before the water supply process is started,
   wherein at least one of the first rotor or the second rotor comprises a plurality of convertible magnets with magnetic poles that are reversible based on the conversion operation, and
   wherein the processor is further configured to:
   store a position and a magnetic pole of a convertible magnet of the plurality of convertible magnets, and
   control the current supplied to the plurality of coils to reverse a magnetic pole comprising a polarity opposite to a polarity of a magnetic pole for driving the motor in the first rotation mode among the plurality of convertible magnets based on the stored position and the stored magnetic pole of the convertible magnet.

2. The washing machine of claim 1, wherein the processor is configured to control the motor to be driven in the second rotation mode after the water supply process is completed.

3. The washing machine of claim 2, wherein the processor is configured to control to apply a magnetizing current to at least one of a U-phase coil, a V-phase coil, or a W-phase coil of the plurality of coils after the water supply process is completed.

4. The washing machine of claim 2, wherein the processor is configured to:
   control to apply a magnetizing current of a predetermined magnitude to at least one of a U-phase coil, a V-phase coil or a W-phase coil of the plurality of coils after the water supply process is completed, and
   control an amplitude of a d-axis current or an amplitude of a q-axis current on the motor to be equal to or larger than the predetermined magnitude when the magnetizing current of the predetermined magnitude is applied.

5. The washing machine of claim 1, further comprising:
   a magnetic flux sensor configured to detect a magnetic flux of at least one of a first magnet of the first rotor or a second magnet of the second rotor,
   wherein the processor is configured to determine whether the motor is driven in the first rotation mode based on a detection result of the magnetic flux sensor.

6. The washing machine of claim 1, further comprising:
   a speed sensor configured to detect a rotational speed of the first rotor and the second rotor,
   wherein the processor is configured to determine whether the motor is driven in the first rotation mode based on a detection result of the speed sensor.

7. The washing machine of claim 1, wherein the processor is configured to control the current supplied to the plurality of coils to repeatedly reverse the magnetic pole of the convertible magnet until the motor has no magnetic pole whose polarity is opposite to the magnetic pole for driving in the first rotation mode.

8. The washing machine of claim 1, wherein the processor is configured to:
   rotate the second rotor in one direction, and
   control the current supplied to the plurality of coils to increase a magnetic force of a front side in a rotating direction of the second rotor of the convertible magnet while the second rotor is rotating.

9. The washing machine of claim 8, wherein the processor is configured to:
   rotate the second rotor in a direction opposite to the one direction, and
   control the current supplied to the plurality of coils to increase the magnetic force of the front side in the rotating direction of the second rotor of the convertible magnet while the second rotor is rotating.

10. The washing machine of claim 1, wherein the processor is configured to:
  rotate the second rotor in one direction, and
  control the current supplied to the plurality of coils to reverse a magnetic pole of a rear side in a rotating direction of the second rotor of the convertible magnet while the second rotor is rotating.

11. The washing machine of claim 10, wherein the processor is configured to:
  rotate the second rotor in a direction opposite to the one direction, and
  control the current supplied to the plurality of coils to reverse the magnetic pole of the rear side in the rotating direction of the second rotor of the convertible magnet while the second rotor is rotating.

12. A motor, comprising:
  a stator including a plurality of coils;
  a first rotor rotatable independently from the stator;
  a second rotor rotatable independently from the stator;
  wherein the plurality of coils are configured to convert a number of magnetic poles of at least one of the first rotor or the second rotor; and
  at least one processor configured to:
    control a current supplied to the plurality of coils to perform a conversion operation so that the motor is driven in (i) a first rotation mode of rotating the first rotor and the second rotor in a same direction or (ii) a second rotation mode of rotating the first rotor and the second rotor in opposite directions,
    determine that the second rotor does not operate in the second rotation mode, and
    control the current supplied to the plurality of coils to drive the first rotor and the second rotor in the first rotation mode based on determining that the second rotor does not operate in the second rotation mode,
  wherein at least one of the first rotor or the second rotor comprises a plurality of convertible magnets with magnetic poles that are reversible based on the conversion operation, and
  wherein the processor is further configured to:
    store a position and a magnetic pole of a convertible magnet of the plurality of convertible magnets, and
    control the current supplied to the plurality of coils to reverse a magnetic pole comprising a polarity opposite to a polarity of a magnetic pole for driving the motor in the first rotation mode among the plurality of convertible magnets based on the stored position and the stored magnetic pole of the convertible magnet.

13. The motor of claim 12, wherein the processor is configured perform a conducting operation, the conducting operation comprising conducting a magnetizing current for converting the magnetic poles of a convertible magnet of the plurality of convertible magnets to a U-phase coil, a V-phase coil, and a W-phase coil of the plurality of coils at least one time when the second rotor does not operate.

14. The motor of claim 13, wherein the processor is configured to:
  drive the first rotor and the second rotor in the first rotation mode after the magnetizing current is conducted to the plurality of coils, and
  repeatedly control the conducting operation on the plurality of coils when the second rotor does not operate.

15. The motor of claim 13, wherein:
  the plurality of convertible magnets are configured to reverse the magnetic poles based on the conversion operation, and
  the processor is configured to:
    rotate the second rotor in one direction, and
    control the current supplied to the plurality of coils to increase a magnetic force of a front side in a rotating direction of the second rotor of the convertible magnet while the second rotor is rotating.

16. The motor of claim 15, wherein the processor is configured to:
  rotate the second rotor in a direction opposite to the one direction, and
  control the current supplied to the plurality of coils to increase the magnetic force of the front side in a rotating direction of the second rotor of the convertible magnet while the second rotor is rotating.

17. The motor of claim 15, wherein the processor is configured to:
  rotate the second rotor in the one direction and control the current supplied to the plurality of coils to reverse a magnetic pole of a rear side in the rotating direction of the second rotor of the convertible magnet while the second rotor is rotating; and
  rotate the second rotor in the direction opposite to the one direction and control the current supplied to the plurality of coils to reverse the magnetic pole of the rear side in the rotating direction of the second rotor of the convertible magnet while the second rotor is rotating.

18. A washing machine that performs a water supply process and a washing process, the washing machine comprising:
  a rotary tub configured to accommodate laundry;
  a water tub in which the rotary tub is provided;
  a pulsator provided in the rotary tub and configured to rotate;
  a motor configured to rotate the rotary tub and the pulsator, wherein the motor comprises:
    a stator including a plurality of coils;
    a first rotor rotatable independently from the stator;
    a second rotor rotatable independently from the stator;
    wherein the plurality of coils are configured to convert a number of magnetic poles of at least one of the first rotor or the second rotor; and
    at least one processor configured to:
      control a current supplied to the plurality of coils to perform a conversion operation so that the motor is driven in (i) a first rotation mode of rotating the first rotor and the second rotor in a same direction or (ii) a second rotation mode of rotating the first rotor and the second rotor in opposite directions,
      determine that the second rotor does not operate in the second rotation mode, and
      control the current supplied to the plurality of coils to drive the first rotor and the second rotor in the first rotation mode based on determining that the second rotor does not operate in the second rotation mode,
    wherein at least one of the first rotor or the second rotor comprises a plurality of convertible magnets with magnetic poles that are reversible based on the conversion operation, and
    wherein the processor is further configured to:
      store a position and a magnetic pole of a convertible magnet of the plurality of convertible magnets, and
      control the current supplied to the plurality of coils to reverse a magnetic pole comprising a polarity opposite to a polarity of a magnetic pole for driving the motor in the first rotation mode among the plurality of convertible magnets based on the stored position and the stored magnetic pole of the convertible magnet.

19. The washing machine of claim 18, wherein the processor is configured perform a conducting operation, the conducting operation comprising conducting a magnetizing current for converting the magnetic poles of a convertible magnet of the plurality of convertible magnets to a U-phase coil, a V-phase coil, and a W-phase coil of the plurality of coils at least one time when the second rotor does not operate.

* * * * *